United States Patent
Rider et al.

(10) Patent No.: US 11,585,920 B2
(45) Date of Patent: Feb. 21, 2023

(54) VEHICLE SENSOR FUSION

(71) Applicant: Intel Corporation, Santa Clara, CA (US)

(72) Inventors: Tomer Rider, Naahryia (IL); Wenlong Yang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 281 days.

(21) Appl. No.: 16/648,607

(22) PCT Filed: Dec. 28, 2017

(86) PCT No.: PCT/CN2017/119442
§ 371 (c)(1),
(2) Date: Mar. 18, 2020

(87) PCT Pub. No.: WO2019/127227
PCT Pub. Date: Jul. 4, 2019

(65) Prior Publication Data
US 2020/0217952 A1   Jul. 9, 2020

(51) Int. Cl.
*G01S 13/931*  (2020.01)
*G01S 7/41*    (2006.01)
(Continued)

(52) U.S. Cl.
CPC .............. *G01S 13/931* (2013.01); *G01S 7/41* (2013.01); *G01S 13/58* (2013.01); *G01S 13/867* (2013.01);
(Continued)

(58) Field of Classification Search
CPC .......... G05D 1/0253; G05D 2201/0213; G01S 13/931; G01S 13/58; G01S 7/41; G01S 13/867; G06K 9/6289
See application file for complete search history.

(56) References Cited

U.S. PATENT DOCUMENTS 6,408,247 B1 * 6/2002 Ichikawa ............ B60R 21/0134
                                              340/901
2003/0156055 A1 * 8/2003 Tamatsu ................ G01S 13/584
                                              342/107
(Continued)

FOREIGN PATENT DOCUMENTS

CN      101926198 A    12/2010
CN      104035071 A     9/2014
(Continued)

OTHER PUBLICATIONS

Machine Translation of Guoqing's reference (CN107202983A) (Year: 2017).*
(Continued)

*Primary Examiner* — Peter D Nolan
*Assistant Examiner* — Tarek Elarabi
(74) *Attorney, Agent, or Firm* — Schwegman Lundberg & Woessner, P.A.

(57) ABSTRACT

Various systems and methods for optimizing use of environmental and operational sensors are described herein. A system for improving sensor efficiency includes object recognition circuitry implementable in a vehicle to detect an object ahead of the vehicle, the object recognition circuitry configured to use an object detection operation to detect the object from sensor data of a sensor array, and the object recognition circuitry configured to use at least one object tracking operation to track the object between successive object detection operations; and a processor subsystem to: calculate a relative velocity of the object with respect to the vehicle; and configure the object recognition circuitry to adjust intervals between successive object detection operations based on the relative velocity of the object.

25 Claims, 7 Drawing Sheets

(51) Int. Cl.
*G01S 13/58* (2006.01)
*G01S 13/86* (2006.01)
*G05D 1/02* (2020.01)
*G06K 9/62* (2022.01)
*G06V 10/143* (2022.01)
*G06V 20/58* (2022.01)
*G08G 1/16* (2006.01)

(52) U.S. Cl.
CPC ......... *G05D 1/0253* (2013.01); *G06K 9/6289* (2013.01); *G06V 10/143* (2022.01); *G06V 20/58* (2022.01); *G05D 2201/0213* (2013.01); *G08G 1/166* (2013.01)

(56) References Cited

U.S. PATENT DOCUMENTS

| | | | |
|---|---|---|---|
| 2003/0179084 A1 | 9/2003 | Skrbina et al. | |
| 2004/0100563 A1* | 5/2004 | Sablak | H04N 5/23216 348/E7.087 |
| 2004/0140143 A1* | 7/2004 | Saeki | B60K 31/0008 180/271 |
| 2010/0312432 A1* | 12/2010 | Hamada | G08G 1/163 701/31.4 |
| 2011/0103643 A1* | 5/2011 | Salsman | H04N 5/2253 348/241 |
| 2015/0285623 A1* | 10/2015 | Tachibana | G01S 7/4865 250/341.8 |

FOREIGN PATENT DOCUMENTS

| | | |
|---|---|---|
| CN | 107202983 A | 9/2017 |
| EP | 1403660 A1 | 3/2004 |
| KR | 20140078436 A | 6/2014 |
| WO | WO-2019127227 A1 | 7/2019 |

OTHER PUBLICATIONS

"International Application Serial No. PCT/CN2017/119442, International Search Report dated Oct. 15, 2018", 5 pgs.

"International Application Serial No. PCT/CN2017/119442, Written Opinion dated Oct. 15, 2018", 4 pgs.

* cited by examiner

VEHICLE SENSOR FUSION

This application is a U.S. National Stage Filing under 35 U.S.C. 371 from International Application No. PCT/CN2017/119442, filed Dec. 28, 2017 and published in English as WO 2019/127227 on Jul. 4, 2019, which is incorporated herein by reference in its entirety.

TECHNICAL FIELD

Embodiments described herein generally relate to environmental and operational sensors, and in particular, to systems and methods for vehicle sensor fusion.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

Sensors of various types and number are used to implement ADAS. For example, ADAS includes various forward, sideward, and rearward facing sensors in a vehicle. The sensors may include radar, LIDAR (light imaging detection and ranging), cameras, ultrasound, infrared, and other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
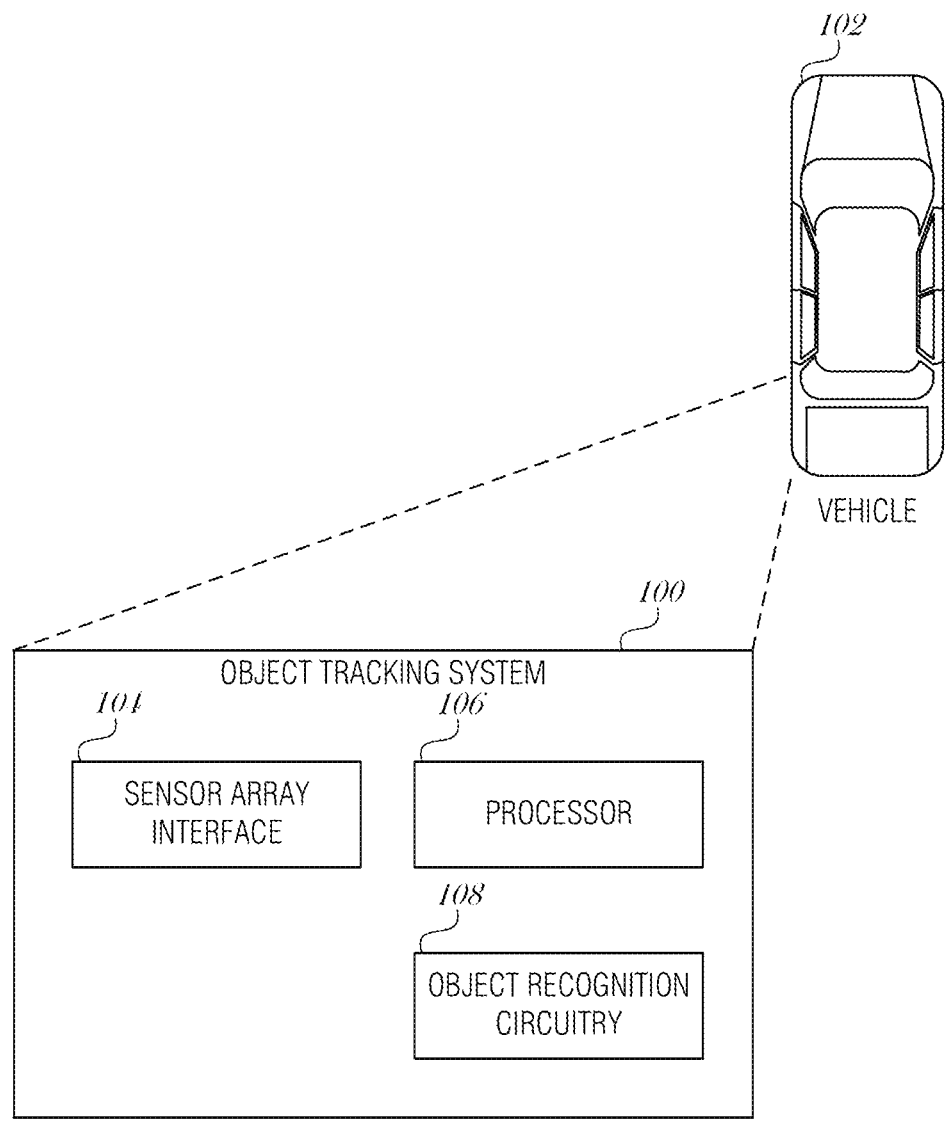
FIG. 1 is a schematic drawing illustrating an onboard object tracking system 100, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Object detection and recognition are leading technologies enabling autonomous vehicles. Multiple sensors such as cameras, LIDAR, radar, and ultrasonic sensors may be used together to complement each other.

Generally, considering the available hardware performance, detection speed, and smoothness, combining a tracking method with an object detection method is optimal. For example, a detection method may be used to detect objects in an image frame. Then a tracking method may be used to track the position of the detected objects in the frame. By separating the detection and tracking methods, efficiencies may be realized. The tracking method usually requires less hardware resources than the detection method. Consequently, by using the tracking method as a throttling mechanism, the system may avoid having to use the detection method in certain circumstances. For instance, when there are no moving objects in the scene, as detected by a relatively inexpensive tracking method, the objects do not need to be identified, avoiding the relatively expensive detection method.

Tracking intervals may be adjusted based on the speed or relative velocity of the moving objects. In many prior art systems, a fixed rate of detection or tracking is used for fixed speed video capturing. However, this fixed rate may be too fast for the circumstances, resulting in wasted resources. For example, a system may use one frame of detection followed by one frame of tracking for a video stream that uses 30 fps (frames per second). In order to detect slow moving objects in real time, the system may only have to detect slowly, for example 5 fps. For high speed objects the system may have to perform the detection at 30 fps to capture the objects in real time or near real time. So if a fixed high detection rate is used, slow moving objects may be oversampled, or fast moving objects may be undersampled.

To provide these advantages, the systems and methods described herein provide a smart operation to determine the optimal detection and tracking ratio for different scenarios by predicting the highest speed of all of the moving objects in the current and previous frames using robust sensor fusion. Based on this highest speed, a sampling rate (tracking rate, detection rate, etc.) may be adjusted to ensure that the object tracking and detection is fast enough to accommodate the fastest moving object.

By adjusting the ratio of detection to tracking based on complementary onboard sensors, the mechanisms disclosed here dynamically adjust the hardware resource consumption needs. It may provide minimum hardware consumption with enough detection/recognition capability, which is critical for autonomous vehicles whose hardware resources are usually limited.

FIG. 1 is a schematic drawing illustrating an onboard object tracking system 100, according to an embodiment. The object tracking system 100 is incorporated into a vehicle 102. The vehicle 102 may be of any type of vehicle, such as a commercial vehicle, a consumer vehicle, a recreation vehicle, a car, a truck, a motorcycle, or a boat. The vehicle 102 may operate at some times in a manual mode where the driver operates the vehicle 102 conventionally using pedals, steering wheel, and other controls. At other times, the vehicle 102 may operate in an autonomous mode, where the vehicle 102 operates without user intervention. In addition, the vehicle 102 may operate in a semi-autonomous mode, where the vehicle 102 controls or assists in aspects of driving, but the driver may control the operation using conventional (e.g., steering wheel) and non-conventional inputs (e.g., voice control).

The vehicle 102 includes a sensor array (not shown), which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle.

Cameras in the sensor array may include infrared or visible light cameras, able to focus at long-range or short-range with narrow or large fields of view.

The vehicle 102 includes an on-board diagnostics system to record vehicle operation and other aspects of the vehicle's performance, maintenance, or status. The vehicle 102 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the onboard object tracking system 100 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 102 obtains sensor data via a sensor array interface 104 from forward-facing sensors to detect objects in front of the vehicle 102. Radar is useful in nearly all weather and in longer range detection, LIDAR is useful for shorter range detection, visible light cameras are useful for longer ranges but often become less effective in certain weather conditions, such as snow. Combinations of sensors may be used to provide the widest flexibility in varying operating conditions.

Based on the sensor data, a processor subsystem 106 in the onboard object tracking system 100 determines relative speeds of the objects in the scene with respect to the vehicle 102. Relative speed (or velocity) may be determined using various methods. In an implementation, the distance to an object in the frame is determined in two successive frames. The processor subsystem 106 may use the image capture rate (e.g., 30 fps) to determine the amount of time that elapsed from frame-to-frame and then determine a delta distance of the object (change in distance from frame-to-frame). The delta distance over time provides a relative velocity or relative speed of the object with respect to the vehicle 102.

The distance may be determined by direct measurement (e.g., with radar, laser measurement, sonar, etc.), or by using prior knowledge (e.g., the height and width of the object in the real world and how it is scaled in the image). Distance may also be determined using wireless techniques, such as vehicle-to-vehicle communication, global positioning system tracking, or the like.

Objects may be detected using an object recognition circuitry 108. The object recognition circuitry 108 may use deep learning methods to detect and recognize objects in an image. Objects of interest may be tracked while other objects may be ignored. Objects of interest include other vehicles, pedestrians, bicyclists, animals, trailers, and the like. Objects of interest include things that may be a collision hazard. Some objects may be ignored, such as buildings. In addition, filters may be used to reduce the number of objects to recognize. For instance, a distance filter may be used such that objects that are farther than a threshold distance may not be processed with object recognition algorithms. This simplifies the object recognition process without loss of safety objectives for the vehicle 102. Objects of interest, or the parameters that are used to recognize such objects, may be selected or configured by a manufacturer, technician, or end user, in various implementations.

Figure 2A:
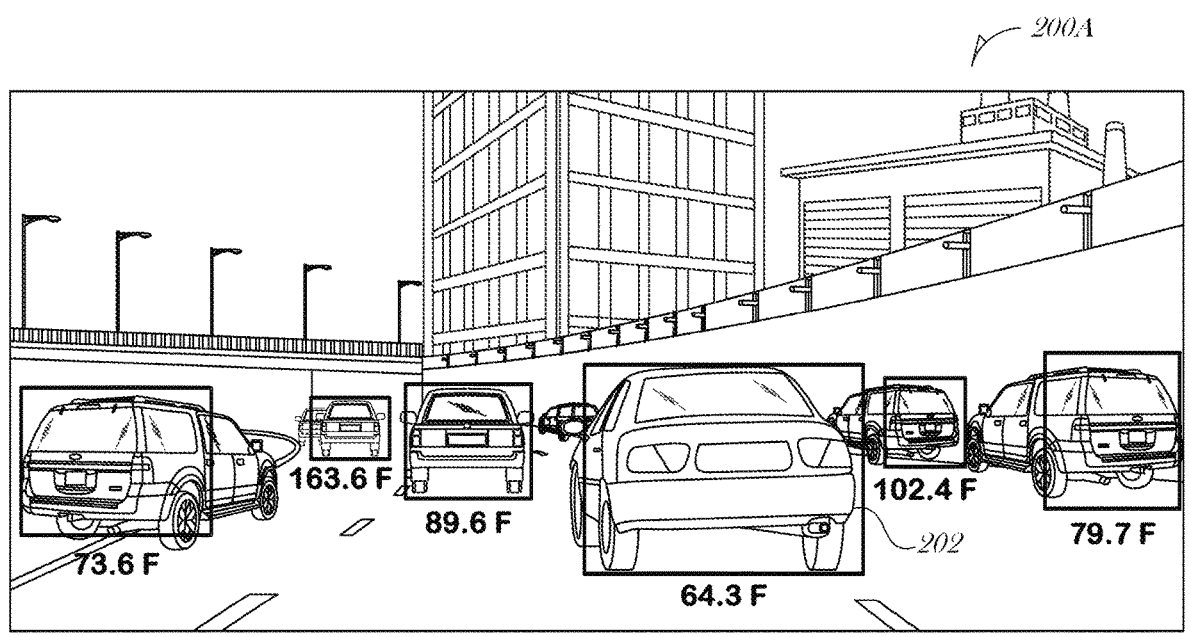
FIGS. 2A-2B are illustrations of two sensor frames, according to an embodiment.
Figure 2B:
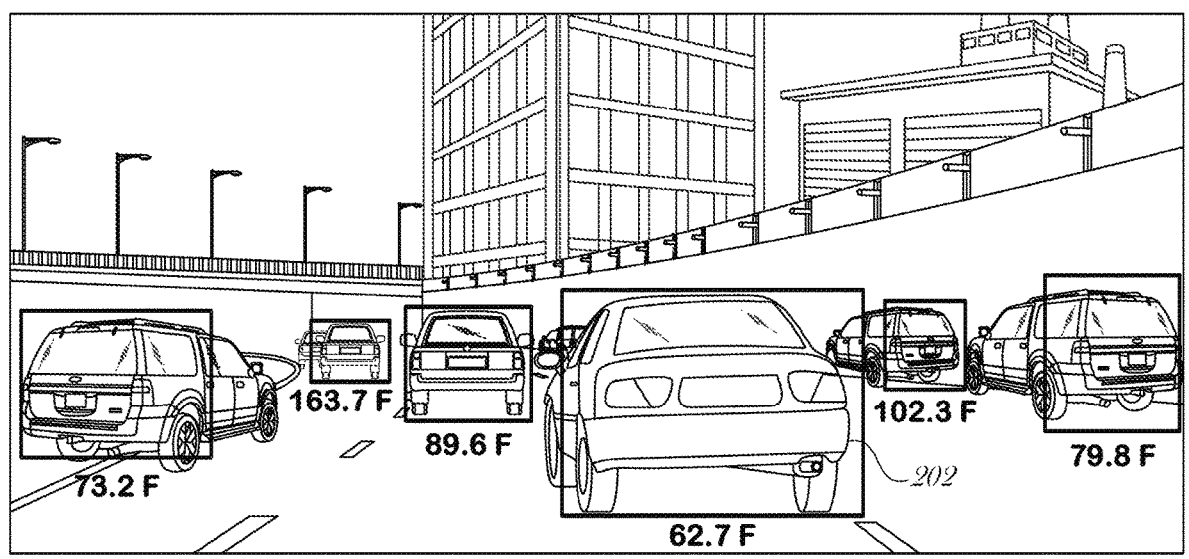

FIGS. 2A-2B are illustrations of two sensor frames 200A and 200B, according to an embodiment. In FIG. 2A, vehicles in front of the host vehicle are tracked and distances to preceding vehicles are determined. The host vehicle is the one equipped with an object tracking system, such as onboard object tracking system 100 as described in FIG. 1. For the purposes of this example, the nearest vehicle 202 will be discussed. It is understood that other vehicles in the scene will be tracked as well for the full method to perform properly.

In the first frame 200A, the nearest vehicle 202 may be measured at a distance of 64.3 feet from the host vehicle. In the second frame 200B, the nearest vehicle 202 has moved with respect to the host vehicle, and is measured at a distance of 62.7 feet from the host vehicle. The delta distance is 64.3−62.7=1.6 feet. If the first and second frames 200A, 200B are adjacent frames in video capture, and the input video capture frequency is 30 fps, then the time interval between these two frames is 1/30 of a second=0.033 second. So the relative velocity of the nearest vehicle 202 with respect to the host vehicle is (64.3 f−62.7 f)/0.033 s=48.5 ft/s.

If instead, the first frame 200A and second frame 200B are frames that are separated by two tracking frames, then the time interval for these the first and second frames 200A, 200B is 3/30=0.1 second. The relative velocity of the nearest vehicle 202 with respect to the host vehicle is (64.3−62.7 f)/0.1 s=16.0 ft/s.

The relative velocity of the detected objects may be determined. The highest relative velocity is used to adjust the ratio between the detection and tracking frames. As such, when there is little movement relative to the host vehicle, for example, when the host vehicle is stopped at a traffic light or when all vehicles around the host vehicle are travelling at approximately the same speed, then the detection algorithm may be used with less frequency, resulting in power and computational savings.

Figure 3A:
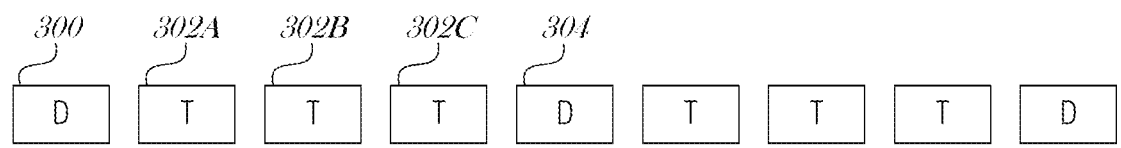
FIGS. 3A-3B illustrate detection and tracking frames, according to an embodiment.
Figure 3B:
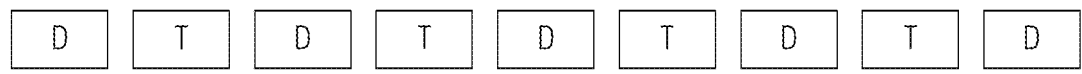

FIGS. 3A-3B illustrate detection and tracking frames, according to an embodiment. In an implementation, an object detection algorithm is performed on a frame and then an object tracking algorithm is performed on one or more successive frames. The frames are video frames from a video capture device (e.g., a visual light camera, radar, LIDAR, etc.). Frame capture rates may vary, but conventional frame capture rates include, but are not limited to 24 fps, 30 fps, 25 fps, 60 fps, and the like. After a detection frame (frame used to detect objects and determine their position or distance from the host vehicle), then one or more tracking frames (frames used to track objects in frame) are used to track the detected objects. A one-to-one interleaving would be where a detection frame is followed by a tracking frame and then another detection frame, and so on. Because object detection is difficult and requires large resources, more than one tracking frame may be used before the next detection frame. Further, because the relative velocities of objects in the frames may indicate that real time tracking is not needed, more frames may be skipped before the next tracking frame.

In FIG. 3A, the host vehicle detects an object near it that has a low relative velocity with respect to the host vehicle. Here, a detection frame 300 is followed by tracking frames 302A-C. A second detection frame 304 is found after the set of tracking frames 302A-C. The first detection frame 300 and second detection frame 304 are used to deter mine the distance to objects in the frames 300 and 304, and the relative velocities of these objects. The detection and tracking frame pattern may continue if the relative velocities have not changed more than some threshold value. This may be the frame pattern observed when the host vehicle is at a stop light, for instance.

In FIG. 3B, the host vehicle detects a fast moving object (e.g., high relative velocity). As a result, the number of tracking frames are reduced from three to one. This results in faster object tracking occurring due to the shorter time interval between tracking frames. ADAS may use this tracking for collision avoidance, driver alert systems, and the like.

Equation 1 may be used to calculate the number of frames to use in the tracking frames interval.

$$v\text{max} = \frac{d}{\left[\frac{(n+1)}{f}\right]} \qquad \text{Equation 1}$$

In Equation 1, vmax is a threshold velocity; d is the distance difference (delta) for the objects over adjacent detection frames; f is the input video stream capture rate, measured in frames per second (fps); and n is the number of tracking frames used following a detection frame.

Equation 2 is a solution of Equation 1, solving for n.

$$n = \frac{d*f}{v\text{max}} - 1 \qquad \text{Equation 2}$$

The value vmax is the threshold velocity for a given situation. The threshold velocity vmax may be determined by the operating context of the host vehicle. For instance, if the host vehicle is travelling at 60 miles per hour (mph), then the threshold velocity may be set to a relative low value, such as 5 mph. Travelling at a highway speed, the driver and vehicle have less time to react to an emergency situation. Also, the evasive action used to avoid collisions is more dangerous at highway speeds. Other operational contexts, such as whether the host vehicle is accelerating, braking, turning, may be used to determine the threshold velocity vmax. Additionally, road condition, weather condition, time of day, traffic congestion, and other factors may be used to set the threshold velocity vmax.

The value for n obtained from Equation 2 will be the number of tracking frames set for the current situation in order to get the best object detection and tracking performance using the minimum hardware resources. The value of n cannot go below zero. So when the d is 0, such as when detected objects are stopped at a traffic light, then the Equation 2 resolves to a value of −1 for n. However, a floor of zero is used in this situation.

The range of n is from zero to some maximum that may be set by a vehicle manufacturer, system manufacturer, administrative operator, end user, or other. The maximum number of tracking frames should be set to a value where the host vehicle is able to detect objects in a reasonable amount of time. In an example, the maximum number of tracking frames is 60, resulting in a period of approximately two seconds at 30 fps between detection frames.

Figure 4:
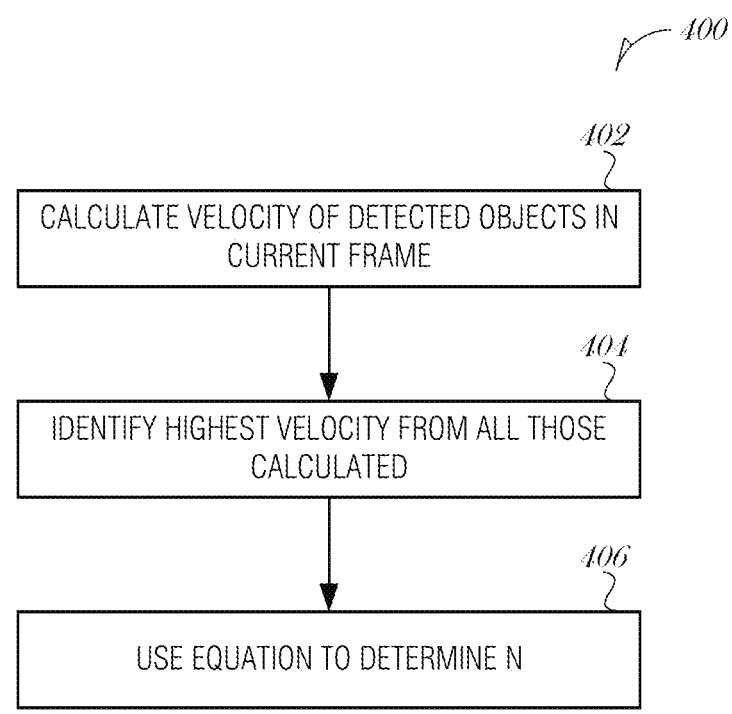
FIG. 4 is a flowchart illustrating a process to use Equation 2, according to an embodiment.

FIG. 4 is a flowchart illustrating a process 400 to use Equation 2, according to an embodiment. At operation 402, the relative velocities of detected objects in the current frame are calculated. This may be performed by comparing distances of objects from a previous frame to the distances of the same objects in the current frame.

At operation 404, the highest relative velocity is identified from those that were calculated in operation 402. This highest relative velocity is of the object that is moving toward the host vehicle at the fastest speed. Objects moving away from the host vehicle have a negative relative velocity and do not pose a danger to the host vehicle.

At operation 406, the highest relative velocity is used in Equation 2 to determine n. The value of n is used to configure subsequent detection frame interval spacing. The process 400 may be executed at each detection frame. In this manner, each time the distances are calculated, Equation 2 is used to determine a new value for n. This new value of n may then be used to arrange the detection/tracking frame pattern.

Figure 5:
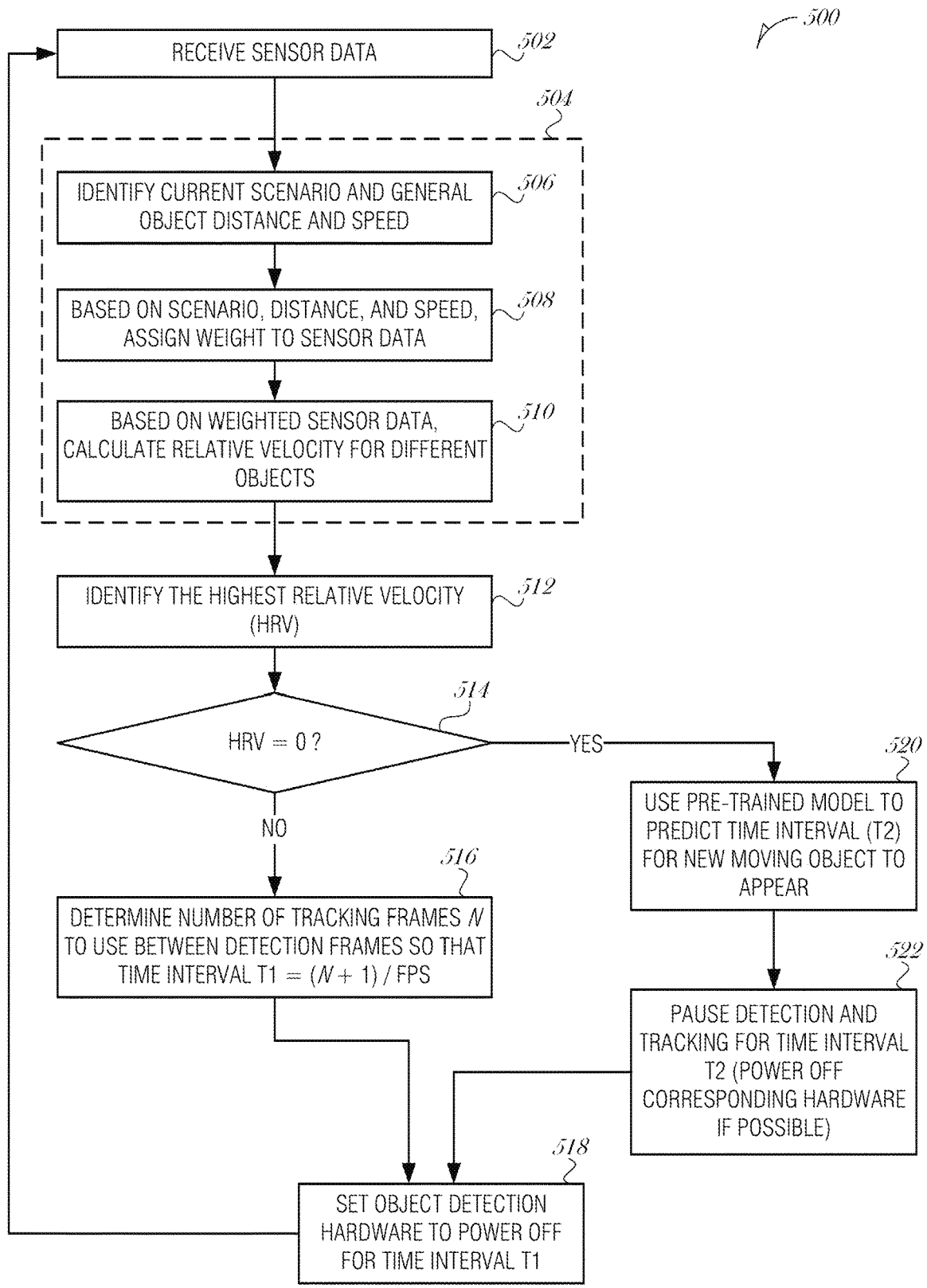
FIG. 5 is a flowchart illustrating a method for efficient sensor implementation, according to an embodiment.

FIG. 5 is a flowchart illustrating a method 500 for efficient sensor implementation, according to an embodiment. At block 502, sensor data is received. The sensor data may be obtained from or received from various sensors integrated on a host vehicle. These sensors include, but are not limited to LIDAR, visible light cameras, radar, sonar, and the like. Sensor fusion is used in phase 504, where a visible light camera is used to identify the current scenario and general object distance (operation 506), weights are assigned to sensor data based on the context and the distance (operation 508), and then the sensor data is fused based on the weights (operation 510).

In sensor fusion phase 504, the general object distance is calculated from one or more images obtained with a visible light camera. The general distance to the object (e.g., the range to the object) is useful to determine which sensor or sensor type is more accurate for distance and velocity calculations. The operating context may refer to the weather (e.g., rain, mist, snow, clear, cold, hot, etc.), road conditions, time of day, and the like. As discussed, radar is useful in nearly all weather and longer range detection, LIDAR is useful for shorter range detection, visible light cameras are useful for longer ranges but often become less effective in certain weather conditions, such as snow. As such, when the objects are far away at night, radar data may be most useful and be weighted higher than LIDAR or visible light cameras. In contrast, when objects are near, LIDAR may be more accurate, and LIDAR data may be weighted higher.

Using the sensor data, which may be weighted according to the operating context and other factors, the highest relative velocity (HRV) is determined (operation 512). The HRV is the object that is moving fastest toward the host vehicle.

If the HRV is higher than zero, then at least one object is moving toward the host vehicle. If the HRV is zero, then the objects are moving at the same velocity as the host vehicle. This may occur when all objects (e.g., vehicles) are stopped at a stop light. The HRV may be less than zero, in which case the objects are moving away from the host vehicle. This situations is largely ignored in this system.

When the HRV is not equal to zero (e.g., greater than zero), then some object is moving toward the host vehicle. The flow moves from decision block 514 to operation 516, where n is calculated. This value n may be calculated using Equation 1, as described from above. This n is the number of tracking frames to pad between successive detections. A time interval T1 is calculated using n and the number of frames per second (fps). If, for example, n=5, and the capture rate is 30 fps, then the time interval T1 is (5+1)/30 =⅕ second. In operation 518, the object detection hardware is powered off for the time interval T1 to conserve power. The flow returns to operation 502 to receive additional sensor data.

When the HRV is zero, as determined at decision block 514, then a pre-trained model is used to predict when a new moving object is likely to appear (operation 520). The time period is referred to as T2 and represents an estimated time when moving objects may appear. For instance, when the host vehicle reaches a stop light and comes to a complete stop, the pre-trained model may indicate that the host vehicle is likely to move again in approximately three minutes based on the time of day, the intersection, the history of light changes, whether the host vehicle is turning (e.g., in a turn lane), and other factors. This time T2 is used to pause object detection and tracking and reduce power consumption (operation 522). The flow continues to operation 518, where the object detection hardware is powered off for the time periods between detections. The value of n is based on the previous value of n in previous iterations of the method 500. There may be a default value of n, such as zero, for the initial state where operation 518 has not been executed yet during the operation of the host vehicle.

For instance, when the host vehicle is first started in a person's garage, there may be no relative movement found. Based on a pre-trained model, the time interval T2 may be set to 20 seconds, representing the typical time the host vehicle rests before being moved from the garage stall (operation 520). Detection and tracking is paused for the 20 seconds. Being that this is the first time through the method 500, a default value of n=30 is used. Based on a 30 fps capture rate of the camera sensor system, this results in approximately 1 sec delays between object detections. When the host vehicle turns onto a road and other vehicles are present, then the relative velocities of these vehicles may be used to determine the tracking frames (operation 516) in later iterations of the method 500.

It is understood that the default value of n may be set to any value. In some cases, setting the default value to a relatively high number (e.g., 500), is useful to preserve power until the vehicle interacts with traffic. A high value may provide power savings during initial operation, at the cost of sensor sensitivity. A relatively low initial value of n, e.g., 10, allows the system to perform object detection more often initially at the cost of power consumption.

Figure 6:
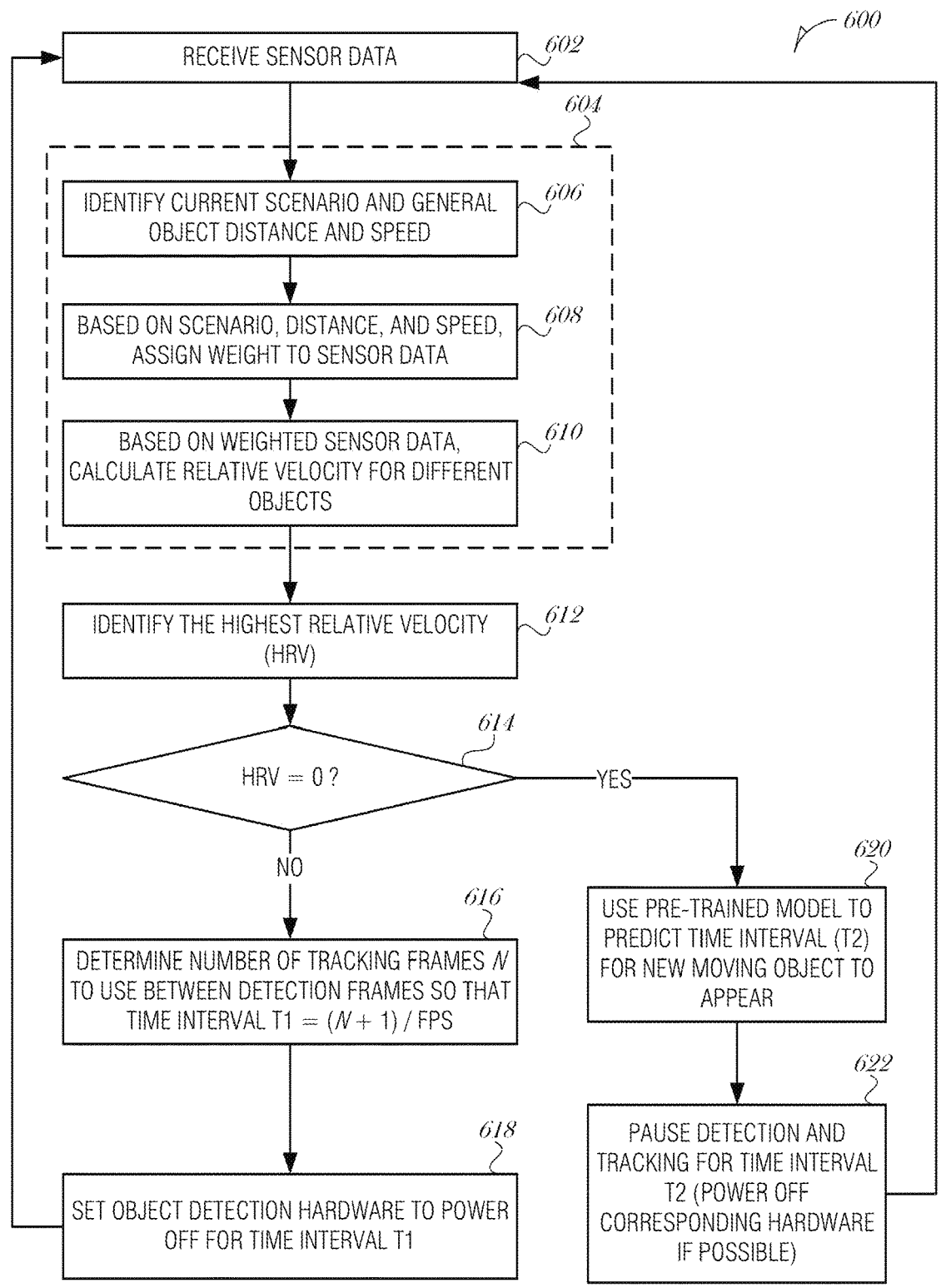
FIG. 6 is a flowchart illustrating a method for efficient sensor implementation, according to an embodiment.

FIG. 6 is a flowchart illustrating a method 600 for efficient sensor implementation, according to an embodiment. The method 600 of FIG. 6 is similar to that of FIG. 5 except for how the detection and tracking is paused or stopped after use of the pre-trained model.

At block 602, sensor data is received. Sensor fusion is used in phase 604, where a visible light camera is used to identify the current scenario and general object distance (operation 606), weights are assigned to sensor data based on the context and the distance (operation 608), and then the sensor data is fused based on the weights (operation 610).

In sensor fusion phase 604, the general object distance is calculated from one or more images obtained with a visible light camera. The general distance to the object (e.g., the range to the object) is useful to determine which sensor or sensor type is more accurate for distance and velocity calculations. The operating context may refer to the weather (e.g., rain, mist, snow, clear, cold, hot, etc.), road conditions, time of day, and the like. As discussed, radar is useful in nearly all weather and longer range detection, LIDAR is useful for shorter range detection, visible light cameras are useful for longer ranges but often become less effective in certain weather conditions, such as snow. As such, when the objects are far away at night, radar data may be most useful and be weighted higher than LIDAR or visible light cameras. In contrast, when objects are near, LIDAR may be more accurate, and LIDAR data may be weighted higher.

Using the sensor data, which may be weighted according to the operating context and other factors, the highest relative velocity (HRV) is determined (operation 612). The HRV is the object that is moving fastest toward the host vehicle.

If the HRV is higher than zero, then at least one object is moving toward the host vehicle. If the HRV is zero, then the objects are moving at the same velocity as the host vehicle. This may occur when all objects (e.g., vehicles) are stopped at a stop light. The HRV may be less than zero, in which case the objects are moving away from the host vehicle. This situations is largely ignored in this system.

When the HRV is not equal to zero (e.g., greater than zero), then some object is moving toward the host vehicle. The flow moves from decision block 614 to operation 616, where n is calculated. This value n may be calculated using Equation 1, as described from above. This n is the number of tracking frames to pad between successive detections. A time interval T1 is calculated using n and the number of frames per second (fps). If, for example, n=5, and the capture rate is 30 fps, then the time interval T1 is (5+1)/30 =⅕ second. In operation 618, the object detection hardware is powered off for the time interval T1 to conserve power. The flow returns to operation 502 to receive additional sensor data.

When the HRV is zero, as determined at decision block 614, then a pre-trained model is used to predict when a new moving object is likely to appear (operation 620). The time period is referred to as T2 and represents an estimated time when moving objects may appear. For instance, when the host vehicle reaches a stop light and comes to a complete stop, the pre-trained model may indicate that the host vehicle is likely to move again in approximately three minutes based on the time of day, the intersection, the history of light changes, whether the host vehicle is turning (e.g., in a turn lane), and other factors. This time T2 is used to pause object detection and tracking and reduce power consumption (operation 622). While paused, the object detection and tracking hardware may be powered off or hibernated to save power.

In contrast to the method 500 of FIG. 5, here in method 600, the flow continues by moving back to the receiving sensor data operation 602.

Figure 7:
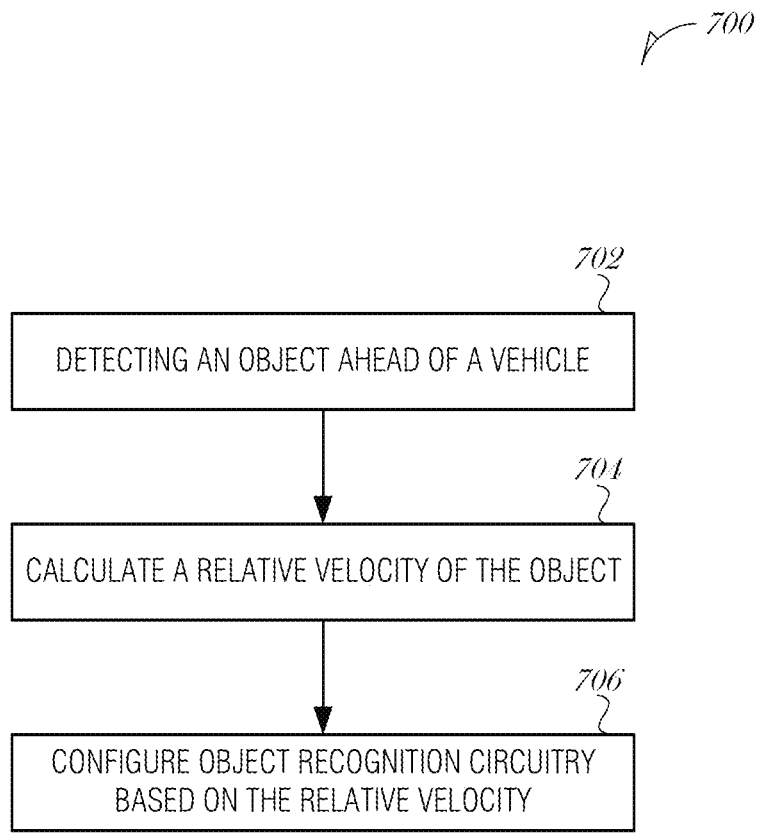
FIG. 7 is a flowchart illustrating a method improving sensor efficiency, according to an embodiment.

FIG. 7 is a flowchart illustrating a method 700 for improving sensor efficiency, according to an embodiment. At 702, using object recognition circuitry installed in a vehicle, an object ahead of the vehicle is detected. The object recognition circuitry is configured to use an object detection operation to detect the object from sensor data of a sensor array. The object recognition circuitry is configured to use at least one object tracking operation to track the object between successive object detection operations.

In an embodiment, the sensor array includes a visible light camera, and in such an embodiment, detecting the object ahead of the vehicle includes obtaining an image from the visible light camera and performing, during an object detection operation, object recognition on the image to detect the object.

In an embodiment, the sensor array include a radar sensor, and in such an embodiment detecting the object ahead of the vehicle includes obtaining a radar scan from the radar and performing, during an object detection operation, object recognition on the radar scan to detect the object.

At 704, a relative velocity of the object with respect to the vehicle is calculated. In an embodiment, calculating the relative velocity of the object includes identifying a current operating scenario of the vehicle, assigning weights to the sensor data from the sensor array based on the current operating scenario to create weighted sensor data, and calculating the relative velocity of the object ahead of the vehicle using the weighted sensor data.

In an embodiment, calculating the relative velocity of the object includes calculating a first distance between the vehicle and the object in a first detection operation, calculating a second distance between the vehicle and the object in a second detection operation, calculating a difference between the first and second distances, and calculating the relative velocity as the difference divided by a time interval between the first and second detection operations.

At 706, the object recognition circuitry is configured to adjust intervals between successive object detection operations based on the relative velocity of the object.

In an embodiment, configuring the object recognition circuitry includes setting a number of object tracking operations between successive object detection operations to adjust intervals between successive object detection operations.

In a further embodiment, the number of object tracking operations, n, is equal to:

$$n = \frac{d * f}{v\max} - 1$$

where d is a distance difference of the object over adjacent detection frames, f is the input video stream capture rate, and vmax is a threshold velocity for a given situation. In a further embodiment, vmax is higher when the vehicle is travelling at a faster velocity, and vmax is lower when the vehicle is travelling at a slower velocity.

In an embodiment, configuring the object recognition circuitry includes powering off the object recognition circuitry during the intervals between successive detection operations.

In an embodiment, the method 700 further includes when the relative velocity is zero, using a pre-trained model to predict a time interval until a moving object is likely to appear and pausing the object detection and object tracking operations for the time interval. In a further embodiment, pausing the object detection and object tracking operations includes powering off or hibernating the object recognition circuitry for the time interval.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 8:
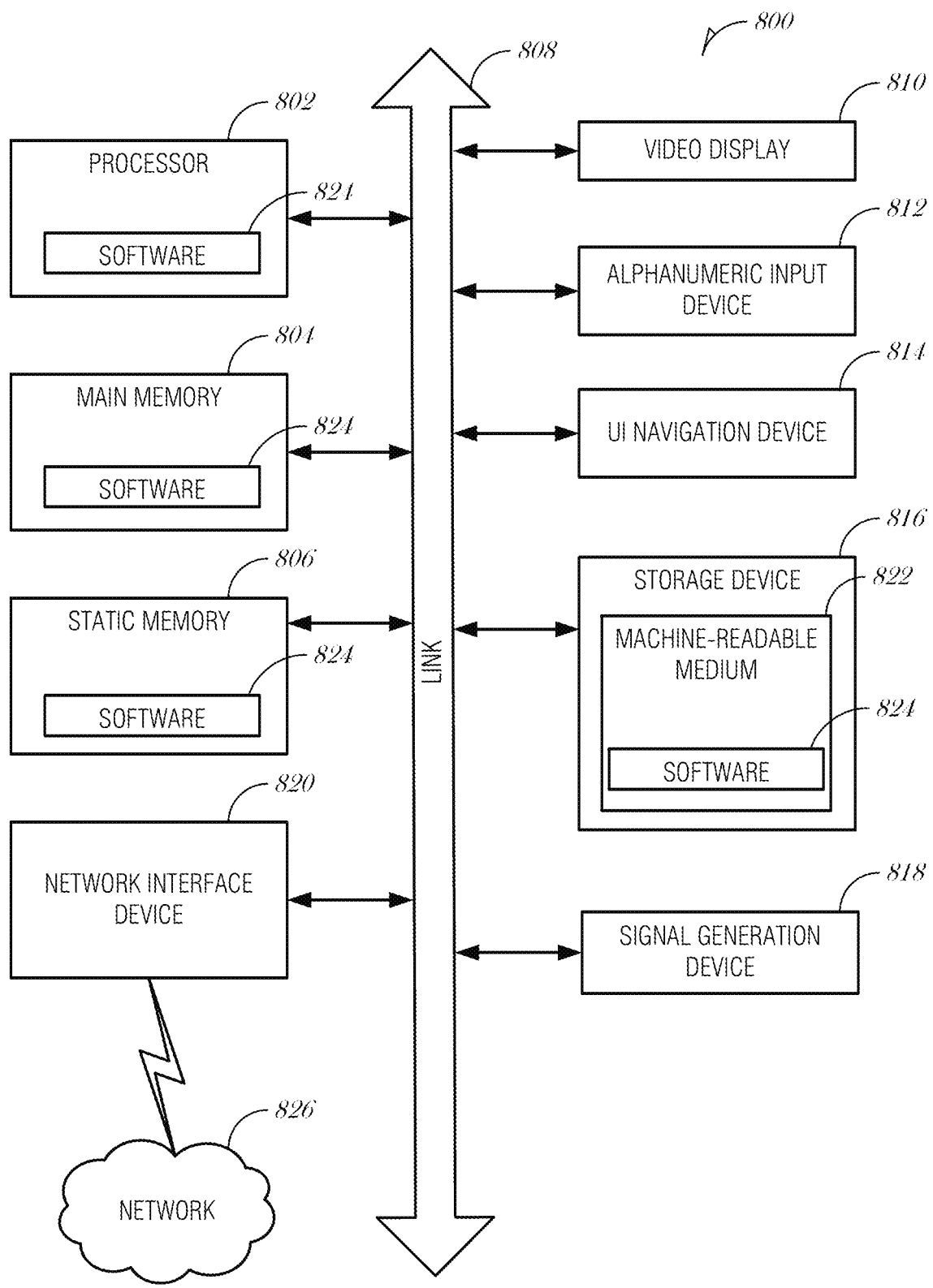
FIG. 8 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry 402 executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry 402 may be embodied as a stand-alone integrated circuit or may be incorporated as one of several components on an integrated circuit. In some embodiments, the various components and circuitry of the node 400 or other systems may be combined in a system-on-a-chip (SoC) architecture FIG. 8 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for improving sensor efficiency, the system comprising: object recognition circuitry implementable in a vehicle to detect an object ahead of the vehicle, the object recognition circuitry configured to use an object detection operation to detect the object from sensor data of a sensor array, and the object recognition circuitry configured to use at least one object tracking operation to track the object between successive object detection operations; and a processor subsystem to: calculate a relative velocity of the object with respect to the vehicle; and configure the object recognition circuitry to adjust intervals between successive object detection operations based on the relative velocity of the object.

In Example 2, the subject matter of Example 1 includes, wherein the sensor array includes a visible light camera, and wherein the object detection operation includes: obtaining an image from the visible light camera; and performing, during an object detection operation, object recognition on the image to detect the object.

In Example 3, the subject matter of Examples 1-2 includes, wherein the sensor array include a radar sensor, and wherein the object detection operation includes: obtaining a radar scan from the radar; and performing, during an object detection operation, object recognition on the radar scan to detect the object.

In Example 4, the subject matter of Examples 1-3 includes, wherein to calculate the relative velocity of the object, the processor subsystem is to: identify a current operating scenario of the vehicle; assign weights to the sensor data from the sensor array based on the current operating scenario to create weighted sensor data; and calculate the relative velocity of the object ahead of the vehicle using the weighted sensor data.

In Example 5, the subject matter of Examples 1-4 includes, wherein to calculate the relative velocity of the object, the processor subsystem is to: calculate a first distance between the vehicle and the object in a first detection operation; calculate a second distance between the vehicle and the object in a second detection operation; calculate a difference between the first and second distances; and calculate the relative velocity as the difference divided by a time interval between the first and second detection operations.

In Example 6, the subject matter of Examples 1-5 includes, wherein to configure the object recognition circuitry, the processor subsystem is to: set a number of object tracking operations between successive object detection operations to adjust intervals between successive object detection operations.

In Example 7, the subject matter of Example 6 includes, wherein the number of object tracking operations, n, is equal to: $n=[(d*f)/vmax]-1$ where d is a distance difference of the object over adjacent detection frames, f is the input video stream capture rate, and vmax is a threshold velocity for a given situation.

In Example 8, the subject matter of Example 7 includes, wherein vmax is higher when the vehicle is travelling at a faster velocity, and vmax is lower when the vehicle is travelling at a slower velocity.

In Example 9, the subject matter of Examples 6-8 includes, wherein to configure the object recognition circuitry, the processor subsystem is to: power off the object recognition circuitry during the intervals between successive detection operations.

In Example 10, the subject matter of Examples 1-9 includes, wherein the processor subsystem is to: when the relative velocity is zero, use a pre-trained model to predict a time interval until a moving object is likely to appear; and pause the object detection and object tracking operations for the time interval.

Example 11, the subject matter of Example 10 includes, wherein to pause the object detection and object tracking operations, the processor subsystem is to: power off the object recognition circuitry for the time interval.

In Example 12, the subject matter of Examples 10-11 includes, wherein to pause the object detection and object tracking operations, the processor subsystem is to: hibernate the object recognition circuitry for the time interval.

Example 13 is a method of improving sensor efficiency, the method comprising: detecting, using object recognition circuitry installed in a vehicle, an object ahead of the vehicle, the object recognition circuitry configured to use an object detection operation to detect the object from sensor data of a sensor array, and the object recognition circuitry configured to use at least one object tracking operation to track the object between successive object detection operations; calculating a relative velocity of the object with respect to the vehicle; and configuring the object recognition circuitry to adjust intervals between successive object detection operations based on the relative velocity of the object.

In Example 14, the subject matter of Example 13 includes, wherein the sensor array includes a visible light camera, and wherein detecting the object ahead of the vehicle comprises: obtaining an image from the visible light camera; and performing, during an object detection operation, object recognition on the image to detect the object.

In Example 15, the subject matter of Examples 13-14 includes, wherein the sensor array include a radar sensor, and wherein detecting the object ahead of the vehicle comprises: obtaining a radar scan from the radar; and performing, during an object detection operation, object recognition on the radar scan to detect the object.

In Example 16, the subject matter of Examples 13-15 includes, wherein calculating the relative velocity of the object comprises: identifying a current operating scenario of the vehicle; assigning weights to the sensor data from the sensor array based on the current operating scenario to create weighted sensor data; and calculating the relative velocity of the object ahead of the vehicle using the weighted sensor data.

In Example 17, the subject matter of Examples 13-16 includes, wherein calculating the relative velocity of the object comprises: calculating a first distance between the vehicle and the object in a first detection operation; calculating a second distance between the vehicle and the object in a second detection operation; calculating a difference between the first and second distances; and calculating the relative velocity as the difference divided by a time interval between the first and second detection operations.

In Example 18, the subject matter of Examples 13-17 includes, wherein configuring the object recognition circuitry comprises: setting a number of object tracking operations between successive object detection operations to adjust intervals between successive object detection operations.

In Example 19, the subject matter of Example 18 includes, wherein the number of object tracking operations, n, is equal to: $n=[(d*f)/vmax]-1$ where d is a distance difference of the object over adjacent detection frames, f is the input video stream capture rate, and vmax is a threshold velocity for a given situation.

In Example 20, the subject matter of Example 19 includes, wherein vmax is higher when the vehicle is travelling at a faster velocity, and vmax is lower when the vehicle is travelling at a slower velocity.

In Example 21, the subject matter of Examples 18-20 includes, wherein configuring the object recognition circuitry comprises: powering off the object recognition circuitry during the intervals between successive detection operations.

In Example 22, the subject matter of Examples 13-21 includes, when the relative velocity is zero, using a pre-trained model to predict a time interval until a moving object is likely to appear; and pausing the object detection and object tracking operations for the time interval.

In Example 23, the subject matter of Example 22 includes, wherein pausing the object detection and object tracking operations comprises: powering off the object recognition circuitry for the time interval.

In Example 24, the subject matter of Examples 22-23 includes, wherein pausing the object detection and object tracking operations comprises: hibernating the object recognition circuitry for the time interval.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is an apparatus for improving sensor efficiency, the apparatus comprising: means for detecting, using object recognition circuitry installed in a vehicle, an object ahead of the vehicle, the object recognition circuitry configured to use an object detection operation to detect the object from sensor data of a sensor array, and the object recognition circuitry configured to use at least one object tracking operation to track the object between successive object detection operations; means for calculating a relative velocity of the object with respect to the vehicle; and means for configuring the object recognition circuitry to adjust intervals between successive object detection operations based on the relative velocity of the object.

In Example 28, the subject matter of Example 27 includes, wherein the sensor array includes a visible light camera, and wherein the means for detecting the object ahead of the vehicle comprise: means for obtaining an image from the visible light camera; and means for performing, during an object detection operation, object recognition on the image to detect the object.

In Example 29, the subject matter of Examples 27-28 includes, wherein the sensor array include a radar sensor, and wherein the means for detecting the object ahead of the vehicle comprise: means for obtaining a radar scan from the radar; and means for performing, during an object detection operation, object recognition on the radar scan to detect the object.

In Example 30, the subject matter of Examples 27-29 includes, wherein the means for calculating the relative velocity of the object comprise: means for identifying a current operating scenario of the vehicle; means for assigning weights to the sensor data from the sensor array based on the current operating scenario to create weighted sensor data; and means for calculating the relative velocity of the object ahead of the vehicle using the weighted sensor data.

In Example 31, the subject matter of Examples 27-30 includes, wherein the means for calculating the relative velocity of the object comprise: means for calculating a first distance between the vehicle and the object in a first detection operation; means for calculating a second distance between the vehicle and the object in a second detection operation; means for calculating a difference between the first and second distances; and means for calculating the relative velocity as the difference divided by a time interval between the first and second detection operations.

In Example 32, the subject matter of Examples 27-31 includes, wherein the means for configuring the object recognition circuitry comprise:
means for setting a number of object tracking operations between successive object detection operations to adjust intervals between successive object detection operations.

In Example 33, the subject matter of Example 32 includes, wherein the number of object tracking operations, n, is equal to: $n=[(d*f)/vmax]-1$ where d is a distance difference of the object over adjacent detection frames, f is the input video stream capture rate, and vmax is a threshold velocity for a given situation.

In Example 34, the subject matter of Example 33 includes, wherein vmax is higher when the vehicle is travelling at a faster velocity, and vmax is lower when the vehicle is travelling at a slower velocity.

In Example 35, the subject matter of Examples 32-34 includes, wherein the means for configuring the object recognition circuitry comprise:
means for powering off the object recognition circuitry during the intervals between successive detection operations.

In Example 36, the subject matter of Examples 27-35 includes, when the relative velocity is zero, means for using a pre-trained model to predict a time interval until a moving object is likely to appear; and means for pausing the object detection and object tracking operations for the time interval.

In Example 37, the subject matter of Example 36 includes, wherein the means tor pausing the object detection and object tracking operations comprise: means for powering off the object recognition circuitry for the time interval.

In Example 38, the subject matter of Examples 36-37 includes, wherein the means for pausing the object detection and object tracking operations comprise: means for hibernating the object recognition circuitry for the time interval.

Example 39 is at least one machine-readable medium including instructions for improving sensor efficiency, the instructions when executed by a machine, cause the machine to perform operations comprising: detecting, using object recognition circuitry installed in a vehicle, an object ahead of the vehicle, the object recognition circuitry configured to use an object detection operation to detect the object from sensor data of a sensor array, and the object recognition circuitry configured to use at least one object tracking operation to track the object between successive object detection operations; calculating a relative velocity of the object with respect to the vehicle; and configuring the object recognition circuitry to adjust intervals between successive object detection operations based on the relative velocity of the object.

In Example 40, the subject matter of Example 39 includes, wherein the sensor array includes a visible light camera, and wherein detecting the object ahead of the vehicle comprises: obtaining an image from the visible light camera; and performing, during an object detection operation, object recognition on the image to detect the object.

In Example 41, the subject matter of Examples 39-40 includes, wherein the sensor array include a radar sensor, and wherein detecting the object ahead of the vehicle comprises: obtaining a radar scan from the radar; and performing, during an object detection operation, object recognition on the radar scan to detect the object.

In Example 42, the subject matter of Examples 39-41 includes, wherein calculating the relative velocity of the object comprises: identifying a current operating scenario of the vehicle; assigning weights to the sensor data from the sensor array based on the current operating scenario to create weighted sensor data; and calculating the relative velocity of the object ahead of the vehicle using the weighted sensor data.

In Example 43, the subject matter of Examples 39-42 includes, wherein calculating the relative velocity of the object comprises: calculating a first distance between the vehicle and the object in a first detection operation; calculating a second distance between the vehicle and the object in a second detection operation; calculating a difference between the first and second distances; and calculating the relative velocity as the difference divided by a time interval between the first and second detection operations.

In Example 44, the subject matter of Examples 39-43 includes, wherein configuring the object recognition circuitry comprises: setting a number of object tracking operations between successive object detection operations to adjust intervals between successive object detection operations.

In Example 45, the subject matter of Example 44 includes, wherein the number of object tracking operations, n, is equal to: $n=[(d*f)/vmax]-1$ where d is a distance difference of the object over adjacent detection frames, f is the input video stream capture rate, and vmax is a threshold velocity for a given situation.

In Example 46, the subject matter of Example 45 includes, wherein vmax is higher when the vehicle is travelling at a faster velocity, and vmax is lower when the vehicle is travelling at a slower velocity.

In Example 47, the subject matter of Examples 44-46 includes, wherein configuring the object recognition circuitry comprises: powering off the object recognition circuitry during the intervals between successive detection operations.

In Example 48, the subject matter of Examples 39-47 includes, when the relative velocity is zero, using a pre-trained model to predict a time interval until a moving object is likely to appear; and pausing the object detection and object tracking operations for the time interval.

In Example 49, the subject matter of Example 48 includes, wherein pausing the object detection and object tracking operations comprises: powering off the object recognition circuitry for the time interval.

In Example 50, the subject matter of Examples 48-49 includes, wherein pausing the object detection and object tracking operations comprises: hibernating the object recognition circuitry for the time interval.

Example 60 is at least one machine-readable medium including instructions that, when executed by a processor subsystem, cause the processor subsystem to perform operations to implement of any of Examples 1-59.

Example 61, is an apparatus comprising means to implement of any of Examples 1-59.

Example 62 is a system to implement of any of Examples 1-59.

Example 63 is a method to implement of any of Examples 1-59.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for improving sensor efficiency, the system comprising:
   object recognition circuitry implementable in a vehicle to detect an object ahead of the vehicle, the object recognition circuitry configured to use an object detection operation to detect the object from sensor data of a sensor array, and the object recognition circuitry configured to use at least one object tracking operation to track the object between successive object detection operations; and
   a processor subsystem to:
   calculate a relative velocity of the object with respect to the vehicle; and
   configure the object recognition circuitry to adjust intervals between successive object detection operations based on the relative velocity of the object;

wherein the object recognition circuitry is further configured to adjust the intervals between the successive object detection operations based on a determined number of object tracking operations, the number of object tracking operations being determined from each of: (i) a capture rate of the sensor data, (ii) a distance difference of the object over adjacent captures of the sensor data, and (iii) a threshold velocity for a given situation of an operational context of the vehicle.

2. The system of claim 1, wherein the sensor array includes a visible light camera, and wherein the object detection operation includes:
obtaining an image from the visible light camera; and
performing, during the object detection operation, object recognition on the image to detect the object.

3. The system of claim 1, wherein the sensor array includes a radar sensor, and wherein the object detection operation includes:
obtaining a radar scan from the radar sensor; and
performing, during the object detection operation, object recognition on the radar scan to detect the object.

4. The system of claim 1, wherein to calculate the relative velocity of the object, the processor subsystem is to:
identify a current operating scenario of the vehicle;
assign weights to the sensor data from the sensor array based on the current operating scenario to create weighted sensor data; and
calculate the relative velocity of the object ahead of the vehicle using the weighted sensor data.

5. The system of claim 1, wherein to calculate the relative velocity of the object, the processor subsystem is to:
calculate a first distance between the vehicle and the object in a first detection operation;
calculate a second distance between the vehicle and the object in a second detection operation;
calculate a difference between the first and second distances; and
calculate the relative velocity as the difference divided by a time interval between the first and second detection operations.

6. The system of claim 1, wherein to configure the object recognition circuitry, the processor subsystem is to:
set the number of object tracking operations between successive object detection operations to adjust the intervals between successive object detection operations;
wherein the number of object tracking operations, n, is equal to:

$$n = \left[\frac{d * f}{v\max}\right] - 1$$

where d is a distance difference of the object over adjacent detection frames, f is an input video stream capture rate, and vmax is the threshold velocity for the given situation of the operational context of the vehicle.

7. The system of claim 6, wherein vmax is higher when the vehicle is travelling at a faster velocity, and vmax is lower when the vehicle is travelling at a slower velocity.

8. The system of claim 6, wherein to configure the object recognition circuitry, the processor subsystem is to:
power off the object recognition circuitry during the intervals between successive detection operations.

9. The system of claim 1, wherein the processor subsystem is to:
when the relative velocity is zero, use a pre-trained model to predict a time interval until a moving object is likely to appear; and
pause the object detection and object tracking operations for the time interval.

10. The system of claim 9, wherein to pause the object detection and object tracking operations, the processor subsystem is to:
power off the object recognition circuitry for the time interval.

11. The system of claim 9, wherein to pause the object detection and object tracking operations, the processor subsystem is to:
hibernate the object recognition circuitry for the time interval.

12. A method of improving sensor efficiency, the method comprising:
detecting, using object recognition circuitry installed in a vehicle, an object ahead of the vehicle, the object recognition circuitry configured to use an object detection operation to detect the object from sensor data of a sensor array, and the object recognition circuitry configured to use at least one object tracking operation to track the object between successive object detection operations;
calculating a relative velocity of the object with respect to the vehicle; and
configuring the object recognition circuitry to adjust intervals between successive object detection operations based on the relative velocity of the object;
wherein the object recognition circuitry is further configured to adjust the intervals between the successive object detection operations based on a determined number of object tracking operations, the number of object tracking operations being determined from each of: (i) a capture rate of the sensor data, (ii) a distance difference of the object over adjacent captures of the sensor data, and (iii) a threshold velocity for a given situation of an operational context of the vehicle.

13. The method of claim 12, wherein the sensor array includes a visible light camera, and wherein detecting the object ahead of the vehicle comprises:
obtaining an image from the visible light camera; and
performing, during the object detection operation, object recognition on the image to detect the object.

14. The method of claim 12, wherein the sensor array includes a radar sensor, and wherein detecting the object ahead of the vehicle comprises:
obtaining a radar scan from the radar sensor; and
performing, during the object detection operation, object recognition on the radar scan to detect the object.

15. The method of claim 12, wherein calculating the relative velocity of the object comprises:
identifying a current operating scenario of the vehicle;
assigning weights to the sensor data from the sensor array based on the current operating scenario to create weighted sensor data; and
calculating the relative velocity of the object ahead of the vehicle using the weighted sensor data.

16. The method of claim 12, wherein calculating the relative velocity of the object comprises:
calculating a first distance between the vehicle and the object in a first detection operation;
calculating a second distance between the vehicle and the object in a second detection operation;
calculating a difference between the first and second distances; and calculating the relative velocity as the difference divided by a time interval between the first and second detection operations.

17. The method of claim 12, wherein configuring the object recognition circuitry comprises:
   setting the number of object tracking operations between successive object detection operations to adjust the intervals between successive object detection operations;
   wherein the number of object tracking operations, n, is equal to:

$$n = \left[\frac{d*f}{v\max}\right] - 1$$

where d is a distance difference of the object over adjacent detection frames, f is an input video stream capture rate, and vmax is the threshold velocity for the given situation of the operational context of the vehicle.

18. The method of claim 17, wherein vmax is higher when the vehicle is travelling at a faster velocity, and vmax is lower when the vehicle is travelling at a slower velocity.

19. The method of claim 17, wherein configuring the object recognition circuitry comprises:
   powering off the object recognition circuitry during the intervals between successive detection operations.

20. At least one non-transitory machine-readable medium comprising instructions for improving sensor efficiency, the instructions when executed by a machine, cause the machine to perform operations comprising:
   detecting, using object recognition circuitry installed in a vehicle, an object ahead of the vehicle, the object recognition circuitry configured to use an object detection operation to detect the object from sensor data of a sensor array, and the object recognition circuitry configured to use at least one object tracking operation to track the object between successive object detection operations;
   calculating a relative velocity of the object with respect to the vehicle; and
   configuring the object recognition circuitry to adjust intervals between successive object detection operations based on the relative velocity of the object;
   wherein the object recognition circuitry is further configured to adjust the intervals between the successive object detection operations based on a determined number of object tracking operations, the number of object tracking operations being determined from each of: (i) a capture rate of the sensor data, (ii) a distance difference of the object over adjacent captures of the sensor data, and (iii) a threshold velocity for a given situation of an operational context of the vehicle.

21. The non-transitory machine-readable medium of claim 20, wherein the sensor array includes a visible light camera, and wherein detecting the object ahead of the vehicle comprises:
   obtaining an image from the visible light camera; and
   performing, during the object detection operation, object recognition on the image to detect the object.

22. The non-transitory machine-readable medium of claim 20, wherein the sensor array includes a radar sensor, and wherein detecting the object ahead of the vehicle comprises:
   obtaining a radar scan from the radar sensor; and
   performing, during the object detection operation, object recognition on the radar scan to detect the object.

23. The non-transitory machine-readable medium of claim 20, wherein calculating the relative velocity of the object comprises:
   identifying a current operating scenario of the vehicle;
   assigning weights to the sensor data from the sensor array based on the current operating scenario to create weighted sensor data; and
   calculating the relative velocity of the object ahead of the vehicle using the weighted sensor data.

24. The non-transitory machine-readable medium of claim 20, wherein configuring the object recognition circuitry comprises:
   setting the number of object tracking operations between successive object detection operations to adjust the intervals between successive object detection operations;
   wherein the number of object tracking operations, n, is equal to:

$$n = \left[\frac{d*f}{v\max}\right] - 1$$

where d is a distance difference of the object over adjacent detection frames, f is an input video stream capture rate, and vmax is the threshold velocity for the given situation of the operational context of the vehicle.

25. The non-transitory machine-readable medium of claim 24, wherein vmax is higher when the vehicle is travelling at a faster velocity, and vmax is lower when the vehicle is travelling at a slower velocity.

* * * * *

UNITED STATES PATENT AND TRADEMARK OFFICE
CERTIFICATE OF CORRECTION

PATENT NO. : 11,585,920 B2
APPLICATION NO. : 16/648607
DATED : February 21, 2023
INVENTOR(S) : Rider et al.

It is certified that error appears in the above-identified patent and that said Letters Patent is hereby corrected as shown below:

In the Claims

In Column 21, Line 21, in Claim 18, delete "vrnax" and insert --vmax-- therefor

Signed and Sealed this
Twentieth Day of February, 2024

Katherine Kelly Vidal
*Director of the United States Patent and Trademark Office*